(12) United States Patent
Sinnema et al.

(10) Patent No.: US 12,246,874 B2
(45) Date of Patent: Mar. 11, 2025

(54) DEVICE FOR HOLDING ARTICLES TO REMOVE THE PACKAGING THEREFROM

(71) Applicant: BD KIESTRA B.V., Drachten (NL)

(72) Inventors: Jurjen Sinnema, Joure (NL); Roger Petri, Assen (NL)

(73) Assignee: BD KIESTRA B.V., Drachten (NL)

( * ) Notice: Subject to any disclaimer, the term of this patent is extended or adjusted under 35 U.S.C. 154(b) by 855 days.

(21) Appl. No.: 17/278,997

(22) PCT Filed: Oct. 4, 2018

(86) PCT No.: PCT/EP2018/077007
§ 371 (c)(1),
(2) Date: Mar. 23, 2021

(87) PCT Pub. No.: WO2020/069743
PCT Pub. Date: Apr. 9, 2020

(65) Prior Publication Data
US 2022/0033125 A1    Feb. 3, 2022

(51) Int. Cl.
*B65B 69/00* (2006.01)
*B65B 7/28* (2006.01)
*G01N 35/04* (2006.01)

(52) U.S. Cl.
CPC ........ *B65B 69/0008* (2013.01); *B65B 7/2807* (2013.01); *G01N 35/04* (2013.01); *G01N 2035/0405* (2013.01)

(58) Field of Classification Search
CPC . B65B 69/0008; B65B 7/2807; B65B 69/003; B65B 69/0091; G01N 35/04; G01N 2035/0405
See application file for complete search history.

(56) References Cited

U.S. PATENT DOCUMENTS 1,127,319 A * 2/1915 Thompson ................ A47F 5/01
                                                        211/49.1
4,580,938 A    4/1986 Mojden et al.
(Continued)

FOREIGN PATENT DOCUMENTS

EP         1018544 A1    7/2000
JP         S6099838 A    6/1985
(Continued)

OTHER PUBLICATIONS

Office Action issued in corresponding Japanese Patent Application No. 2021-518495 dated Oct. 11, 2022 (8 pp.).
(Continued)

*Primary Examiner* — Jill A Warden
*Assistant Examiner* — Michael Stanley Gzybowski
(74) *Attorney, Agent, or Firm* — Botos Churchill IP Law LLP

(57) ABSTRACT

A holder for consumables for use in an analyzer is disclosed. The holder has one or more receptacles for receiving a stack of consumables. The consumables are wrapped in packaging and are placed in the holder as a stack of packaged consumables. The receptacles have a height sufficient to receive the stack of consumable. The receptacles have an opening miming along the side of the receptacle for the entire portion of the height of the receptacle that receives the stack of consumables. The receptacles have a proximal end and a distal end. The proximal end is the end of the receptacles into which the stack of consumables is place and from which the consumables are removed. The distal portion of the receptacles support the stack of consumables in the receptacles.

17 Claims, 12 Drawing Sheets

(56) References Cited

U.S. PATENT DOCUMENTS

| | | | |
|---|---|---|---|
| 6,244,019 B1 | 6/2001 | Ljungqvist et al. | |
| 2001/0024832 A1 | 9/2001 | Seto et al. | |
| 2001/0038017 A1* | 11/2001 | Davis | G07F 11/04 221/188 |
| 2006/0141919 A1* | 6/2006 | Storinggaard | G07D 9/002 453/61 |
| 2007/0090125 A1* | 4/2007 | Njaastad | A47F 1/085 221/309 |
| 2013/0065797 A1* | 3/2013 | Silbert | G01N 35/1004 73/304 C |
| 2015/0241325 A1 | 8/2015 | Webber et al. | |

FOREIGN PATENT DOCUMENTS

| | | | | |
|---|---|---|---|---|
| JP | H0670600 U | 10/1994 | | |
| JP | H119260 A | 1/1999 | | |
| JP | 2018523937 A | 8/2018 | | |
| WO | WO-9859033 A1 * | 12/1998 | | B01L 9/52 |
| WO | 2012132844 A1 | 10/2012 | | |
| WO | 2016191646 A2 | 12/2016 | | |

OTHER PUBLICATIONS

International Search Report and Written Opinion of International Application No. PCT/EP2018/077007 dated Jun. 5, 2019 (12 pages).
Action issued in Canadian Patent Application No. 3,114,016 dated Jan. 22, 2025 (3 pp.).

* cited by examiner

DEVICE FOR HOLDING ARTICLES TO REMOVE THE PACKAGING THEREFROM

CROSS-REFERENCE TO RELATED APPLICATIONS

The present application is a national phase entry under 35 U.S.C. § 371 of International Application No. PCT/EP2018/077007, filed Oct. 4, 2018, published as International Publication No. WO 2020/069743 A1, the disclosure of which is hereby incorporated herein by reference.

BACKGROUND OF THE INVENTION

Panels are recognized in the healthcare industry as providing a simple way of handling and storing multiple microbiological specimens. One example of a test panel is the Phoenix™ ID/AST combination panel ("Phoenix Panel") from Becton Dickinson ("BD"). The Phoenix Panel is a sealed and self-inoculating molded polystyrene tray that includes 136 micro-wells containing dried reagents. It includes an identification side with dried substrates for bacterial identification and an AST side with varying concentrations of antimicrobial agents. The Phoenix Panel also includes growth and fluorescent controls at appropriate well locations. Of the 136 wells, 51 are on the identification side and 85 on the AST side. In other non-limiting examples of the Phoenix Panel, the wells can be ID only (Phoenix™ NID Panels and Phoenix™ PID Panels) or AST only (Phoenix™ NMIC Panels and Phoenix™ PMIC Panels). One variant of the Phoenix Panel is illustrated in FIGS. 1 and 2.

Once the panels are inoculated, the panels are capped. AST panel 90, as shown in FIGS. 1 and 2, is illustrative of the panels used for AST testing. Panel 90 can be any panel for performing antibiotic susceptibility testing, such as the Phoenix Panel. Such panels 90 generally include an inlet 95 for inoculating an internal space of the panel 90 with an analyte, which can include a microbial suspension or blood culture, for example. Such inlet 95 may be sealed by a removable cap or a septum cap 99. For example, an automated system (not shown) may include a capper/decapper (not shown) within a transfer station (not shown) which decaps and recaps removable cap 99 with respect to the panel 90.

Automated diagnostic platforms that run AST tests are known. One such platform is described in commonly owned PCT Application No. PCT/US2016/034554, which was published as WO/2016/191646 of Dec. 21, 2016 and is hereby incorporated by reference.

Because of the many steps involved in the preparation and testing of microbiological specimens, handling the panels still requires operator intervention, which is more expensive and less efficient that a completely automated system. That said, operator attention and intervention are required in even the most automated system. Once aspect of otherwise automated systems is the loading and unloading of consumables into the system. The AST panels illustrated in FIGS. 1 and 2 is one such consumable, along with the caps 99 illustrated in FIG. 2. While the placement of the caps 99 onto the panels 90 is automated in some systems, loading of the caps into the instrument is still done manually. The caps for the AST panels are often provided in packaged stacks and those stacks must be placed in the system in such a way that those caps are accessible to the automated device that transfers the caps onto the AST panel. Therefore, caps are manually stocked into an automated system in an inefficient manner. Improvement in the manner in which the consumable caps are stocked into the AST system are sought.

BRIEF SUMMARY OF THE INVENTION

One general aspect includes a consumable holder for packaged consumables in an analyzer, the consumable holder including a plurality of receptacles formed in the consumable holder, the receptacles having a proximate end and a distal end; an opening along a height of each of the plurality of receptacles. The opening is a continuous opening from the proximate end of the receptacle to the distal end of the receptacle; and a support for the consumables proximate to the distal end of the receptacles.

The holder further includes a housing in which the consumable holder is disposed. In one embodiment, the consumable holder is disposed is a drawer in the housing. As such, the consumable holder is carried by the drawer from an open position to a closed position. The consumable holder drawer receives the packaged consumables when the drawer is in the open position. In one embodiment the support for the stack of consumables disposed in the holder is a flange. The flange can be a biased flange. The opening in the consumable holder extends through the support/flange.

Typically, the receptacles will have a cross section with a geometry that allows a stack of packaged consumables to be received by the receptacles. In one exemplary embodiment, the packaged consumables are a stack of caps. The caps in the stack of caps are approximately round. Therefore, in this exemplary embodiment the cross-section geometry of the receptacles is approximately round.

Also described herein is a method for removing packaging from a stack of consumables for an analyzer. According to the method, a stack of packaged consumables is inserted into a receptacle of a plurality of consumables in a consumable holder. The receptacles have a proximal end and a distal end and an opening along a height of each of the plurality of receptacles. The opening is a continuous opening from the proximate end of the receptacle to the distal end of the receptacle. According to the method, the packaging is removed through the opening at the distal end of the receptacles, such that the packaging is removed from the stack of consumables, where the stack of consumables remains in the receptacle and supported therein as the packaging is removed therefrom. The method further includes removing a consumable from the top of the stack of consumables for use in the analyzer.

DETAILED DESCRIPTION

Figure 1:
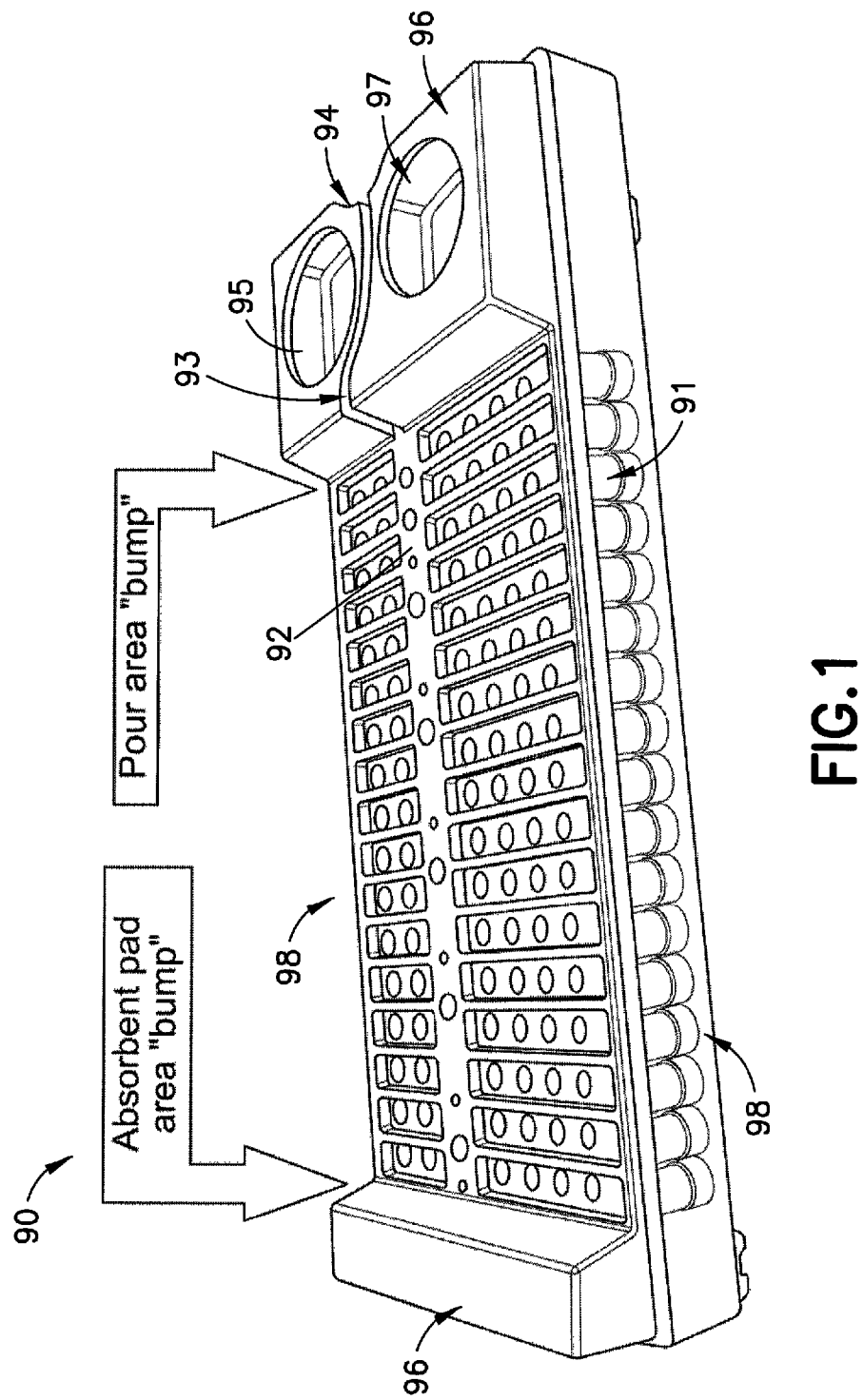
FIG. 1 is a perspective view of an AST panel prior to inoculation.

As noted above, panels for AST testing, and example of which is illustrated in FIG. 1 have many structural features. For example, the panel 90 illustrated in FIG. 1 includes a variety of structural features that can be used for handling the panel using automated apparatus. These include an interstices gap 93 near a central region of the panel running in a generally longitudinal direction, a concave region 98 in a central portion of a top surface of the panel 90, bumps 96 at the upper and lower extremes of the panel 90, among others. Disposed in the concave region of the plate is a plurality of sample wells 91. The depth of those wells 91 is defined by the height of the side wall 98.

The illustrated panel, 90, has two ports 95 and 97. Port 95 receives inoculated ID broth for the ID side of the panel 90 and Port 97 receives inoculated AST broth for the AST side of the panel. The ID side contains wells with dried biochemical substrates and additional fluorescent control wells. The AST side contains wells with dried antimicrobial agents and an additional growth control well. Panels are available as ID only (Phoenix™ NID Panels, Phoenix™ PID Panels), AST only (Phoenix™ NMIC Panels, Phoenix™ PMIC Panels), or ID/AST combination (Phoenix™ NMIC/ID Panels, Phoenix™ PMIC/ID Panels).

Figure 4:
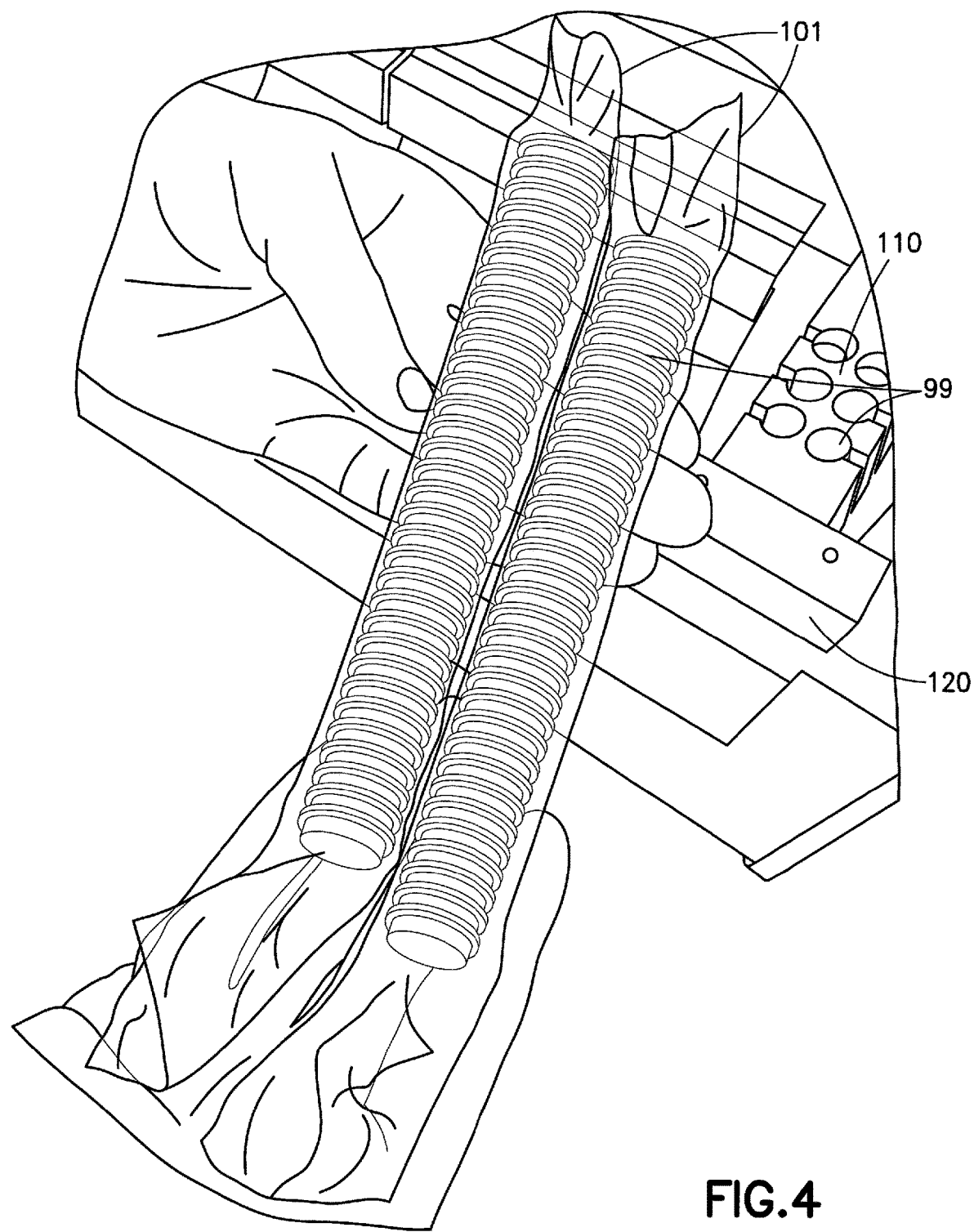
FIG. 4 illustrates a stack of packaged consumables prior to being inserted into the holder disposed in a drawer of the AST apparatus.

Prior to inoculation, the panel is placed on an inoculation station with the inoculation ports 95 and 97 at the top of the panel 90 for filling. Separate inoculated ID and AST broths are added, respectively to the ID and AST ports (ports 95 and 97, respectively). The inocula flow down the panel in serpentine fashion, filling the panel wells as the liquid front progresses toward the pad. The pad absorbs excess inoculum. Caps 99 are inserted in the fill ports. The caps 99 can be placed on the panel either manually or using an automated apparatus. The caps 99 are illustrated in FIG. 4. When the consumable caps 99 are introduced into the system or apparatus, the caps are packaged together. Transparent packaging 101 is illustrated in FIG. 4. An air admittance port is located in the divider area of the panel lid to ensure adequate oxygen tension in the panel for the duration of the test. The packaged caps are placed in a cap holder 110 integrated with a cap holder drawer 120. The cap holder 110 can either be placed in, attached to, or formed with drawer 120.

Figure 2:
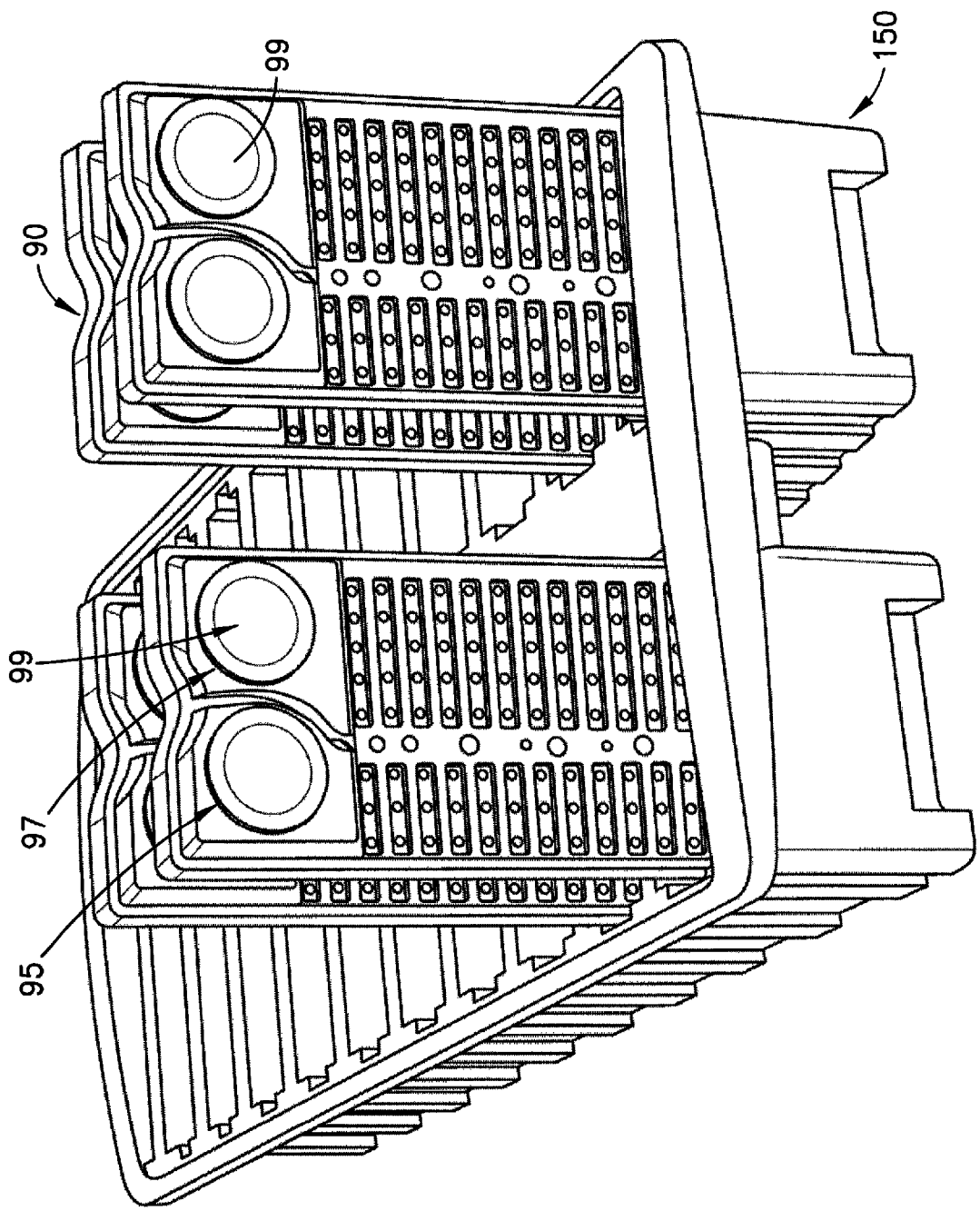
FIG. 2 illustrates a plurality of inoculated AST panel in a carrier.
Figure 3:
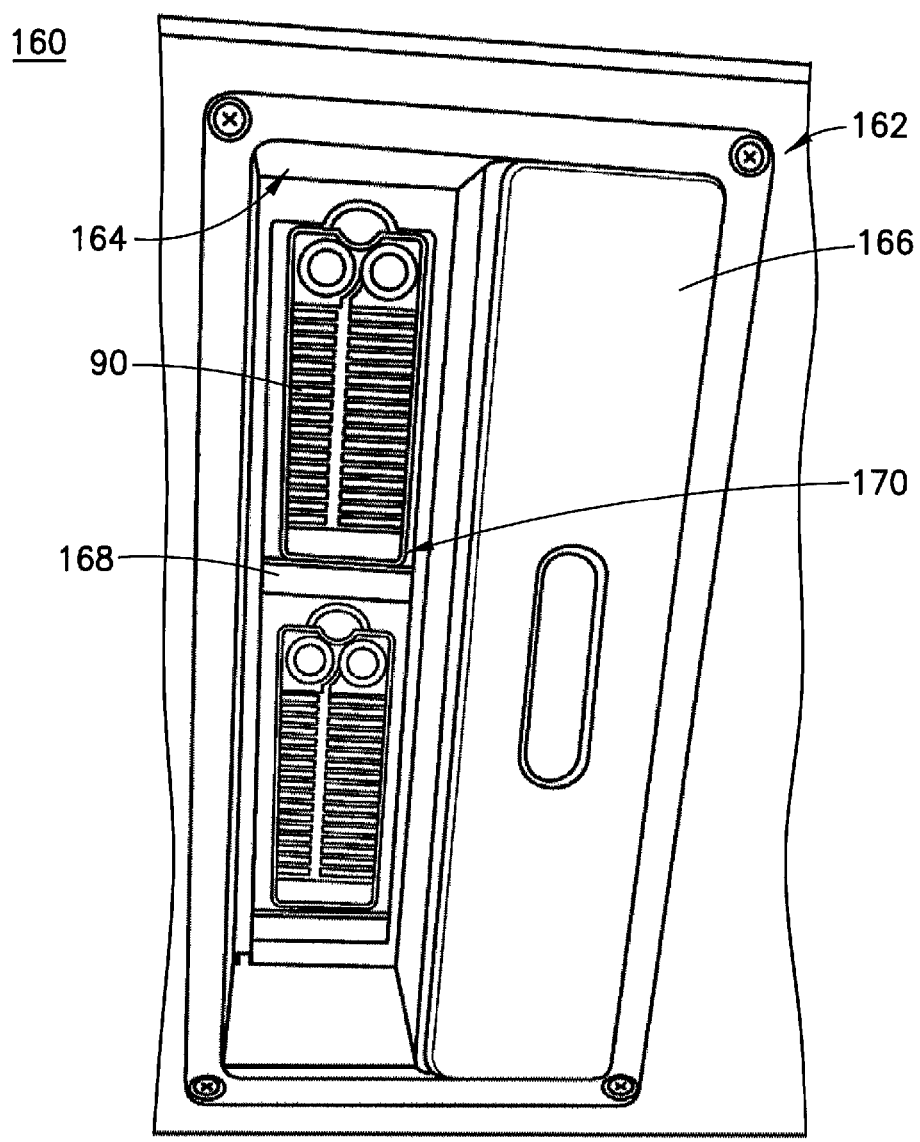
FIG. 3 is a top view of a plurality of AST panels received in a testing apparatus.

Referring to FIG. 2, after inoculation, the panels 90, with caps 99 placed on ports 95 and 97 are placed in a tray 150 or another carrier. This is not required. In automated apparatus, the inoculated panels may be transported directly to a panel testing instrument 160 (FIG. 3).

Panel testing instrument 160 generally includes a housing 162 defining a cavity 164 therein and a door 166 that is operated either manually or automatically for accessing cavity 164. Housing 162 may include a panel holder 168 disposed in the cavity 164 that includes a plurality of receptacles or panel holding structures 170 for receipt of individual panels 90. Panel holder 168 and the receptacles 170 may be moveable within the cavity 164 by activation of a receptacle actuator (e.g. a motor and belt) (not shown) so that each receptacle is presentable to a door opening for receiving or removing panel 90. In one example, panel holder 168 can be a drum with a plurality of receptacles 170 that is rotatable around an axis.

As noted above, each inoculated panel 90 is closed with two caps 99. These caps are packed in a cylindrical bag 101. Caps 99 are used one by one, and the bag 101 needs to be removed from the caps 99 before those caps 99 can be used to close the ports 95, 97 on the panel 90.

Figure 5:
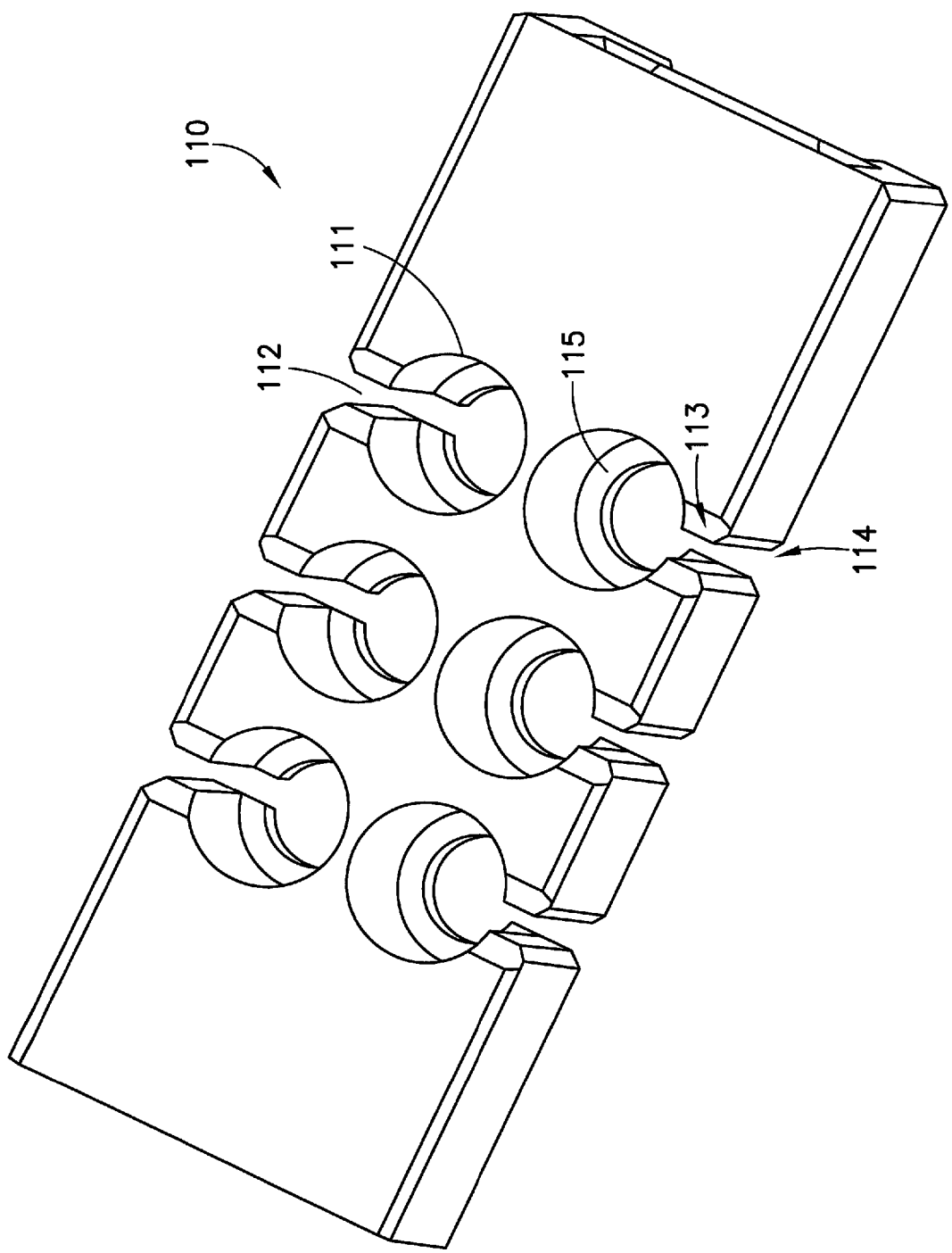
FIG. 5 is a top perspective view of a cap holder according to one embodiment of the present invention.

The consumable holder described herein is, in the described embodiment, configured to accept packages of the above-described caps. However, the skilled person could readily adapt the holder described herein to accept other types of consumables (e.g. cups, lids, etc.) that are delivered into an apparatus in a packaged stack and wherein the packaging is removed from the consumables while they are held in the stack. While the consumable holder is described in the embodiments and drawings as a cap holder, the consumable holder described herein is not limited to a cap holder, but can be used with other stackable consumables as described hereinabove. The consumable (e.g. the above-described cap) holder 110 is adapted to receive the consumable caps 99 in the bag 101. Referring to FIG. 5, the consumable holder 110 has a plurality of cylindrical receptacles 111. The receptacles 111 are have diameter large enough to receive caps 99 therein. Each cylindrical receptacle 111 has a side opening 112 that runs along the entire height of the receptacles 111 in the consumable holder 110 from the proximate top end 113 to the distal bottom end 114. A support flange 115 is positioned proximate the distal end 114 of the receptacle 111 to support the caps 99 disposed in the consumable holder 110.

Figure 6:
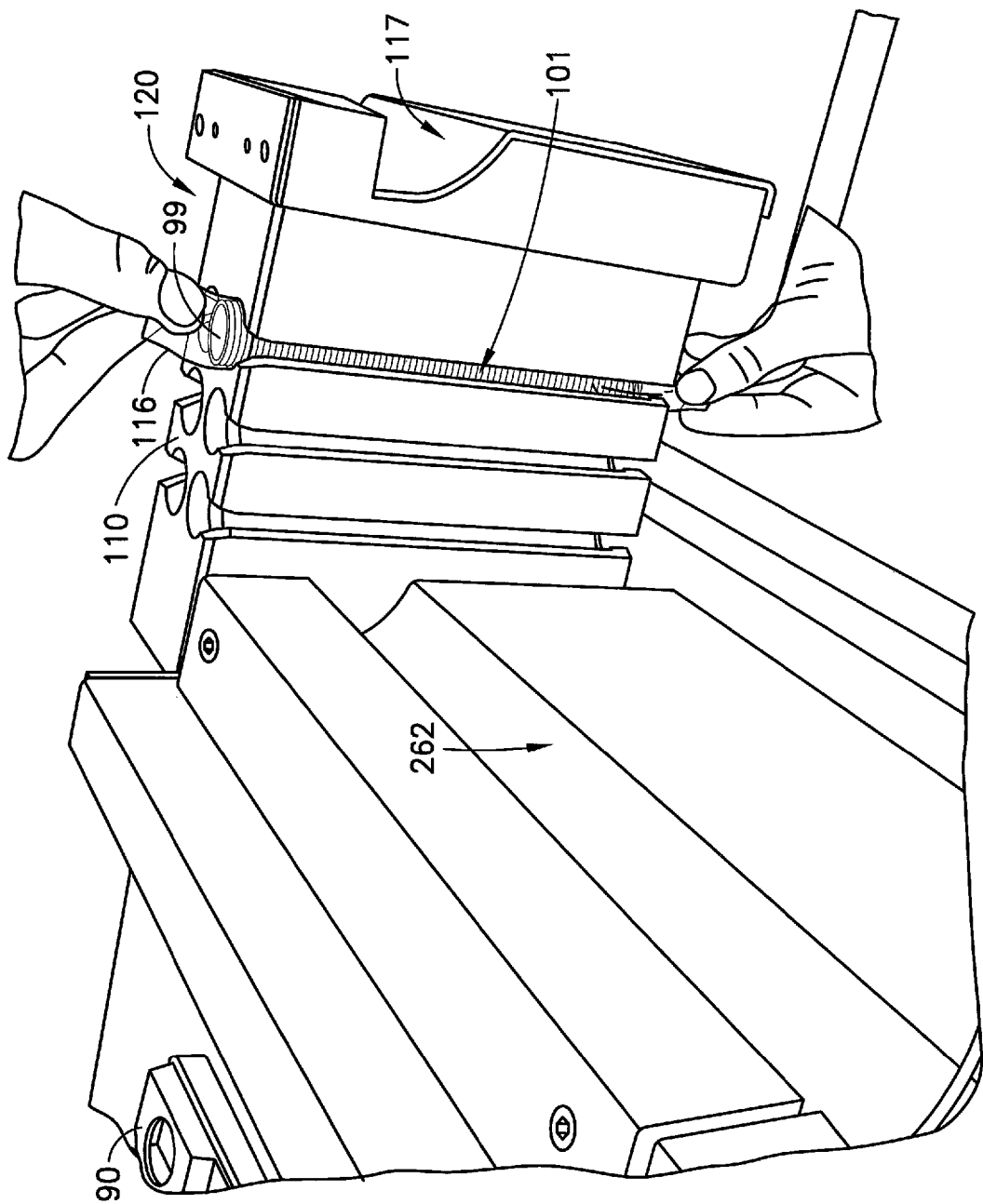
FIG. 6 illustrates the cap holder drawer pulled open to receive a packaged stack of caps from an operator.

The caps 99 in bag 101 are placed in the cylindrical receptacles 111 as illustrated in FIG. 6. Note that the bag 101 has some length 116 that exceeds the height of the stack of caps 99. The bag 101 in which the stack of caps is packaged, in one embodiment, has short and long sides, one at each end. The short and long sides provide an indication to the operator or the automated apparatus the proper direction for placing the stack of caps in the cap holder 110. The longer side of the bag 101 is used to guide the caps into the cap holder. The short side is located at the top of the bag 101, which, as noted elsewhere herein, is weakened to facilitate removing the bag from the caps when the caps are placed in the cap holder.

The consumable holder 110 is integrated with a front portion 117. The assembly of consumable holder 110 and front portion 117 forms drawer 120. Panel 90 is seen resting on another portion of an alternative embodiment of the housing 262.

Figure 7:
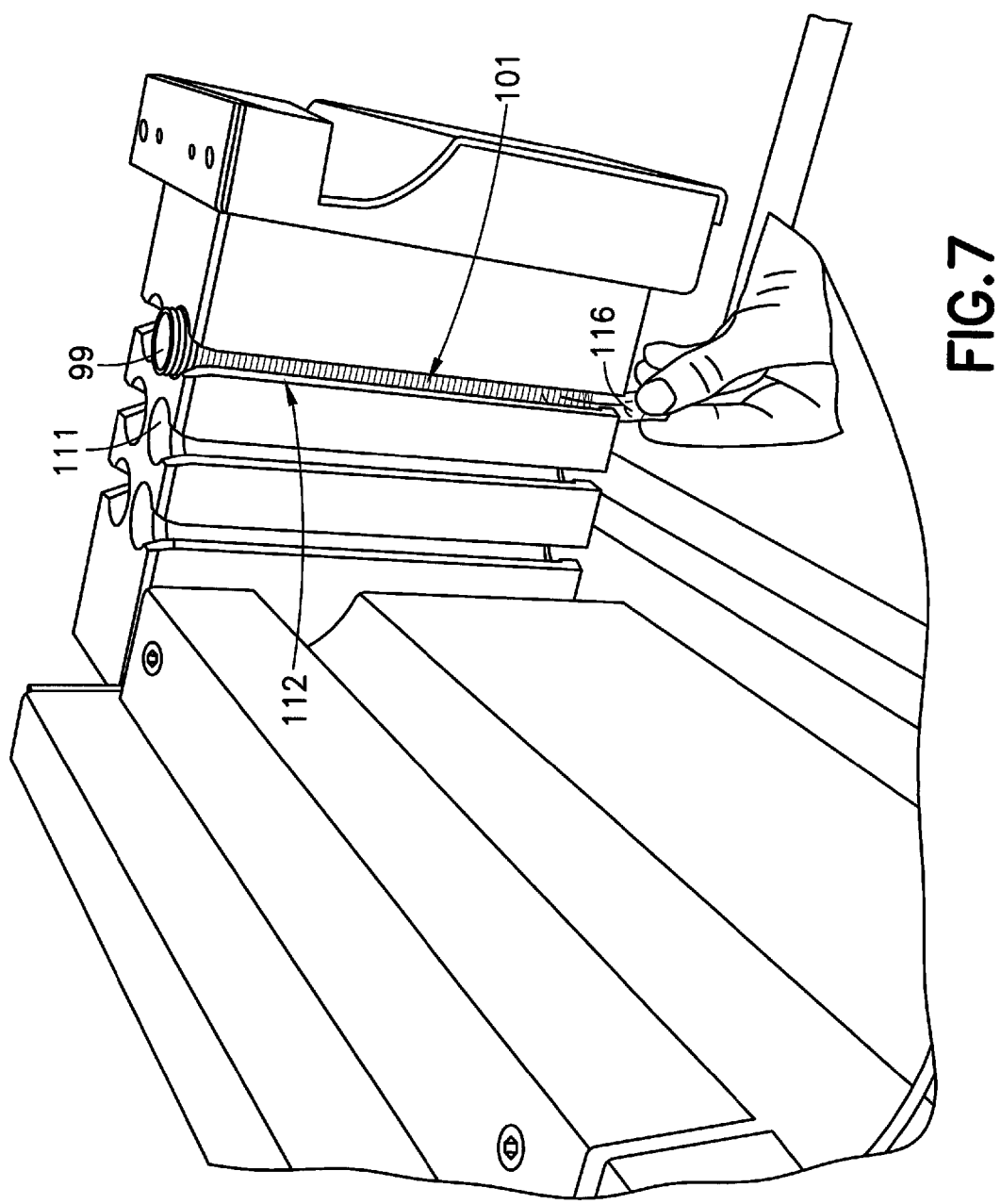
FIG. 7 illustrates an operator grasping the packaging from the open bottom of the cap holder to remove the packaging from the stack of caps disposed in the cap holder.

Referring to FIG. 7, the excess part 116 of the bag 101 is pulled through the opening 112 in the receptacle 111. The bag 101 is pulled downward such that the excess length 116 extends below the lowest cap 99 in the stack of caps.

Figure 8:
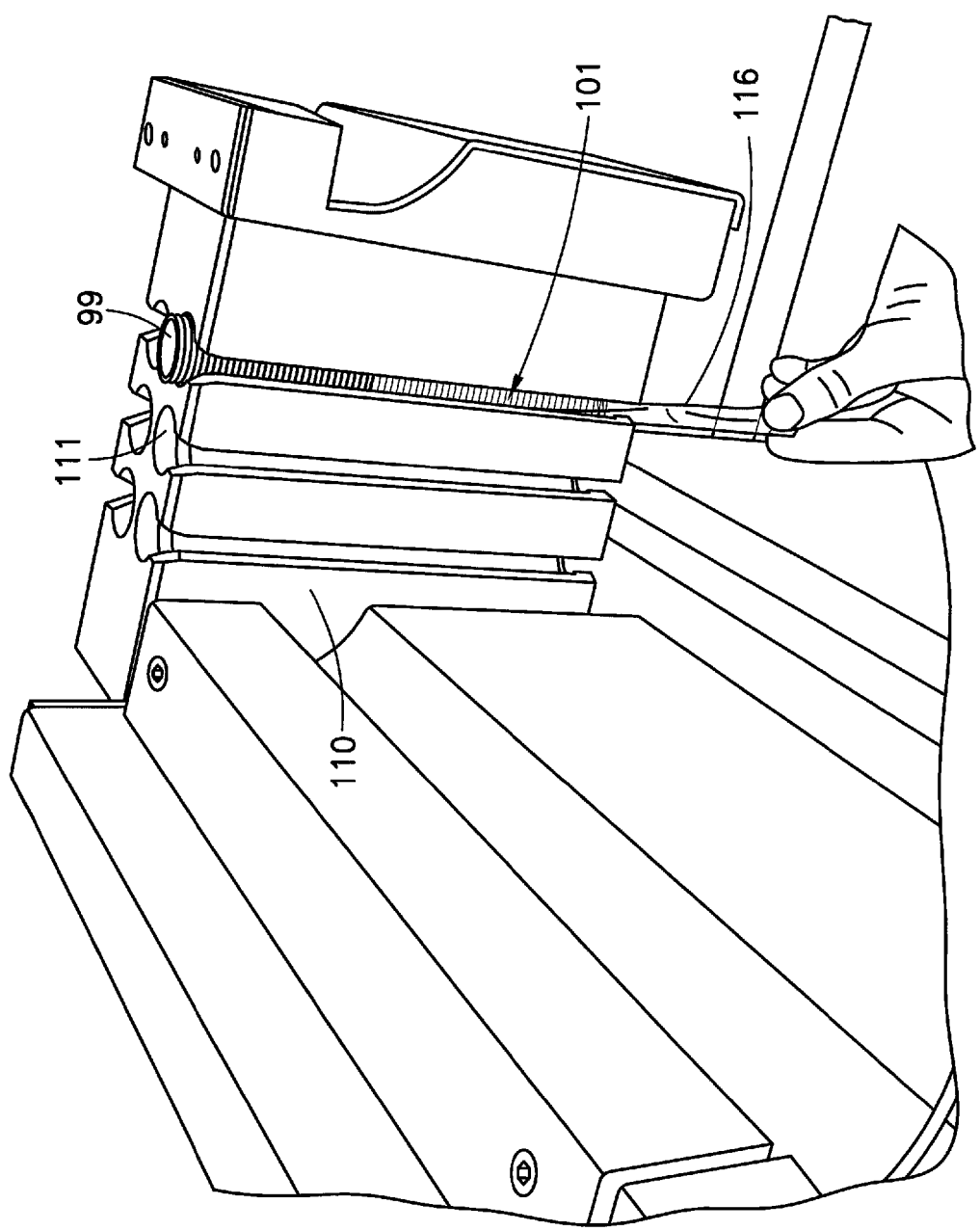
FIG. 8 illustrates an operator pulling the packaging downward wherein the top of the stack of caps is no longer covered by the packaging.

Referring to FIG. 8, with continued downward pull, the excess portion 116 of the bag 101 clears the topmost caps 99 in the stack held by the consumable holder 110 in the receptacles 111.

Figure 9:
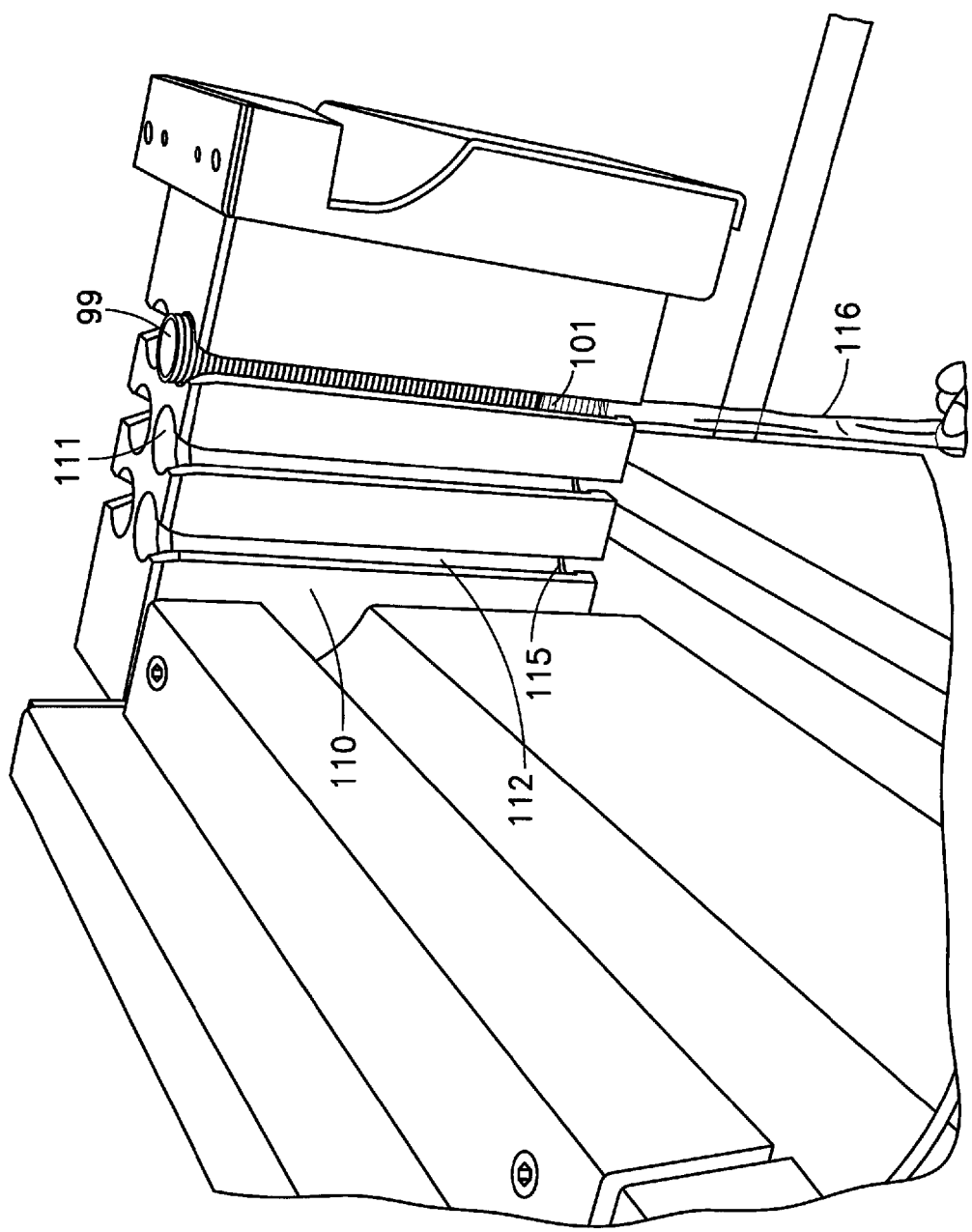
FIG. 9 illustrates the point where the cap holder packaging is almost completely removed from the stack of caps.

Referring to FIG. 9, with continued downward pull, more of the bag 101 is removed from the stack of caps 99 held in the receptacle 111 of the consumable holder 110. At the bottom of the consumable holder 110, the end part 116 of the bag 101 is pulled out manually or automatically through the opening 112. The opening in the flange 115 cooperates with the opening 112 along the height of the consumable holder 110 to permit removal of the bag while retaining the stack of caps 99 in the consumable holder 110. The length of the end part 116 of the bag 101 is sufficient for grasping either manually, as illustrated, or using an automated apparatus for withdrawing the bag 101 from the consumable holder 110.

Figure 10:
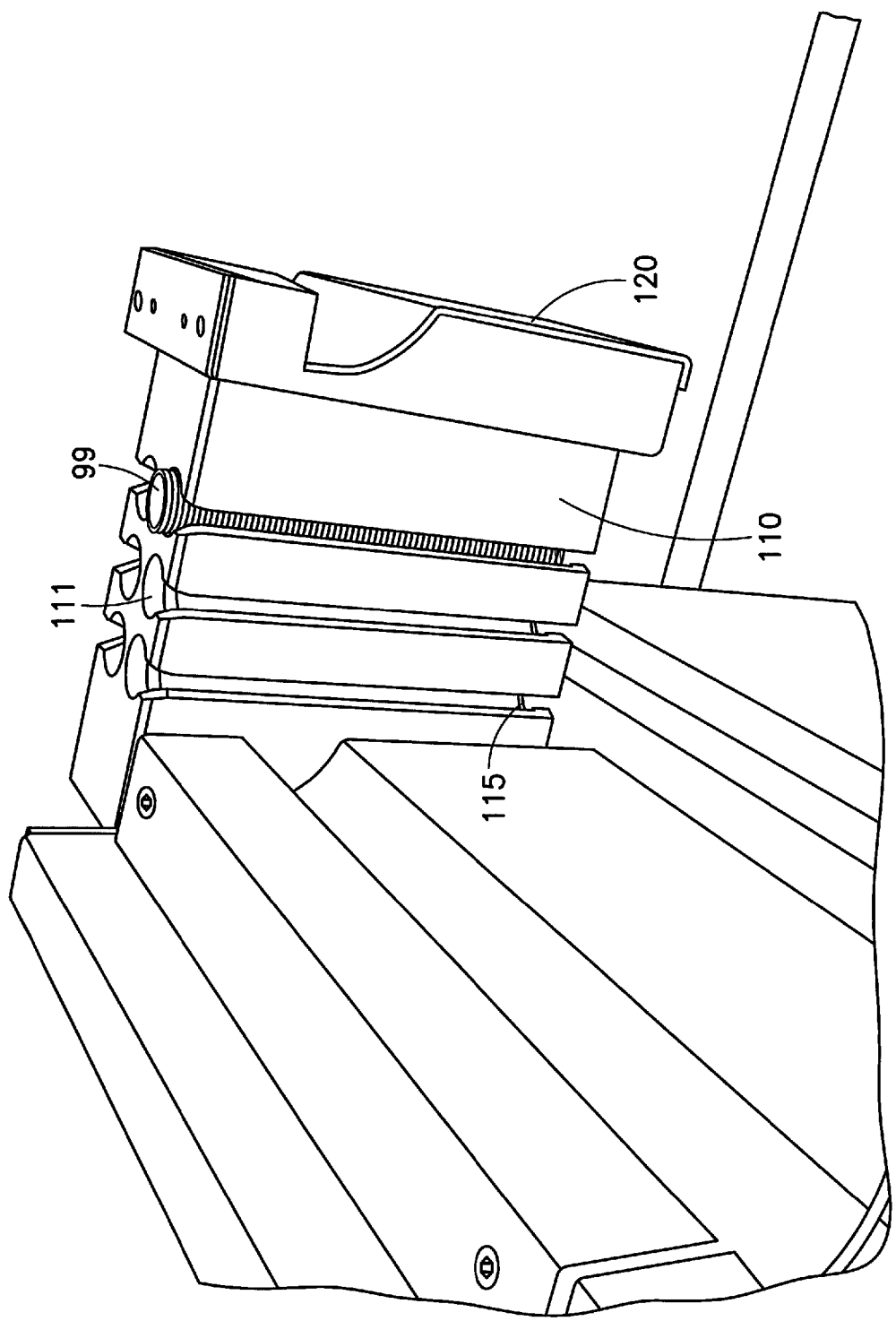
FIG. 10 is a perspective side view of the cap holder drawer with caps disposed in the cap holder.

FIG. 10 illustrate the consumable holder 110/drawer 120 assembly after the bag has been removed. The caps 99, rest in the receptacle 111 of the consumable holder 110, retained in place by the flange 115 at the bottom of the receptacles 111.

Figure 11:
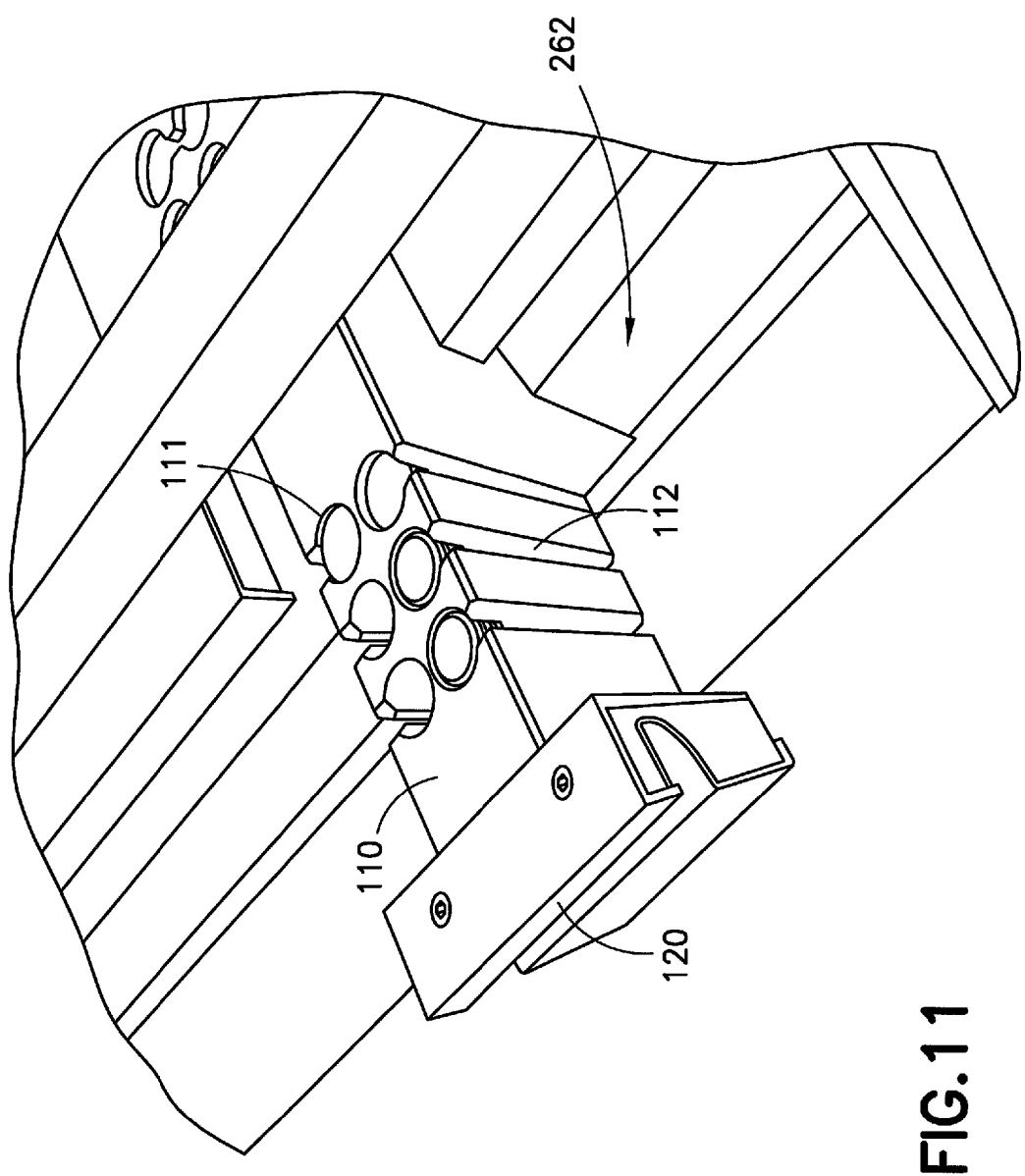
FIG. 11 is a top perspective view of the cap holder drawer of the automated AST apparatus with the cap holder packaging being pulled from the bottom of the cap holder.

FIG. 11 is a top view of the consumable holder 110/drawer 120 assembly with caps 99 retained in receptacles 111 therein. The opening 112 runs the complete height of the consumable holder 110. The drawer 120 can be slid in and out from the housing 262. However, the holder 110 does not need to be disposed in a drawer. The holder might be disposed in a stationary housing that allows for the stack of packaged caps to be inserted into the consumable holder and the packaging removed from the caps while held in the consumable holder. Such housing would need to permit access to the unpackaged stack of consumables (e.g. caps) being held in the holder. Also, the flange disposed in the proximal end of the receptacles 111 might be replaced by another retaining mechanism such as a slightly telescoping lower portion that will support the caps 99 in the receptacles without allowing the caps to fall through the distal end of the receptacles 111. The one caveat on any such retaining mechanism is that it should not prevent the packaging from being completely removed from the stack of caps. In one embodiment the flange may be biased to move upward in the receptacles as caps are removed from the top of the holder. The lessened weight on the flange caused by cap removal allows the flange to remove upward in response.

For the automated process of capping, the bag needs to be removed first, and the individual caps are carried or otherwise fed to a holder of the automated cap system. If the caps remain in the packaging, the caps must be removed manually and place on the panel. Placing the caps on the panel manually takes operator time that might be deployed elsewhere or is not required and is inefficient.

Figure 12A:
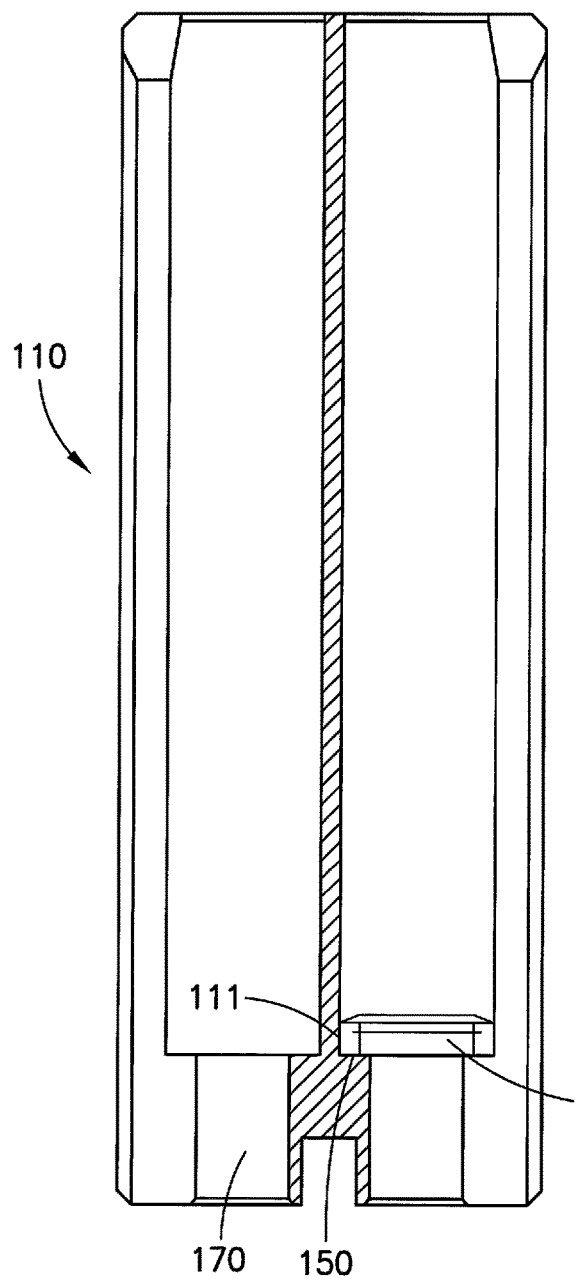
FIG. 12 is a section view of the cap holder drawer, with FIG. 12A showing the caps at the bottom of stack in cut away view and FIG. 12B showing the caps in the cap holder in complete cut away.
Figure 12B:
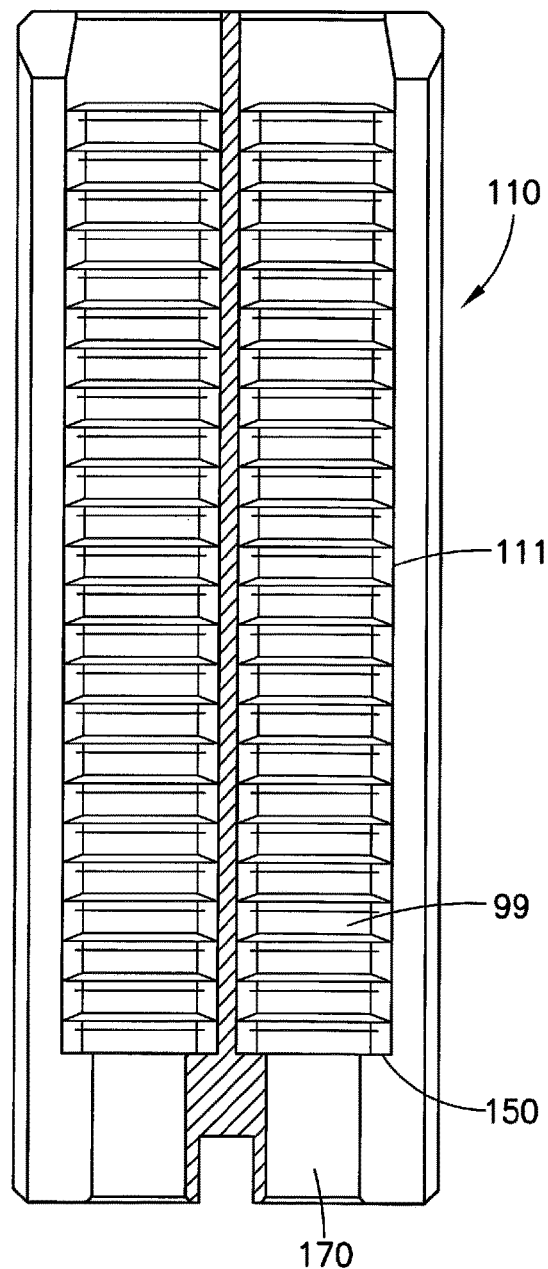

FIG. 12 is a section view of the consumable holder 110. In this embodiment, the flange 150 is in effect a lip with a narrower diameter portion 170 underlying the receptacle 111. The caps 99 at the bottom of the stack are illustrated in the partial cutaway view of FIG. 12A. FIG. 12 B is a full cut-away view of the consumable caps 99, disposed in the receptacles 111 of the consumable holder 110.

In one embodiment, the packaging 101 has a weakened portion at the proximate end of the packaging (i.e. the portion of the packaging 101 that overlies the top cap in the stack of caps held in the packaging). Weakened portion, as used herein are portions that facilitate tearing. Weakened portions that facilitate the tearing of plastic packaging include, by way of example and not limitation, perforations, pre-torn portions, stamped portion, etc.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A consumable holder for packaged consumables in an analyzer, the consumable holder comprising:
    a plurality of receptacles formed in the consumable holder, each receptacle having a proximal end and a distal end;
    a support for packaged consumables proximate to the distal end of the receptacles; and
    a single opening along a height of each of the plurality of receptacles, the opening being a continuous opening from the proximal end of the receptacle to the distal end of the receptacle and extends through the support.

2. The consumable holder of claim 1, wherein the receptacles have a cross section with a geometry that allows a stack of packaged consumables to be received by the receptacles.

3. The consumable holder of claim 1, further comprising a stack of packaged consumables.

4. The consumable holder of claim 1, wherein the support is a flange.

5. The consumable holder of claim 4, wherein the flange is a biased flange.

6. The consumable holder of claim 1, wherein the packaged consumable is a stack of caps.

7. The consumable holder of claim 6, wherein caps in the stack of caps are approximately round.

8. The consumable holder of claim 7, wherein the receptacles have a cross-sectional geometry that is approximately round.

9. The consumable holder of claim 1, further comprising a housing in which the consumable holder is disposed.

10. The consumable holder of claim 9, wherein the consumable holder is disposed in a drawer in the housing.

11. The consumable holder of claim 10, wherein the consumable holder is carried by the drawer from an open position to a closed position.

12. The consumable holder of claim 11, wherein the consumable holder receives the packaged consumables when the drawer is in the open position.

13. A method for removing packaging from a stack of consumables for an analyzer, the method comprising:
    inserting a stack of packaged consumables into a receptacle of a plurality of receptacles in a consumable holder, the plurality of receptacles each having a proximal end and a distal end and a single opening along a height of each of the plurality of receptacles, the single opening being a continuous opening from the proximal end of the receptacle to the distal end of the receptacle, wherein the single opening extends through a support for the stack of packaged consumables proximate to the distal end of the receptacle; and
    pulling the packaging from the single opening at the distal end of the receptacles, such that the packaging is removed from the stack of consumables, wherein the stack of consumables remains in the receptacle and supported therein.

14. The method of claim 13, wherein the consumables are caps for closing ports in a consumable for testing a biological sample.

15. The method of claim 14, wherein the caps are for a panel used to perform at least one of microorganism identification and microorganism antibiotic susceptibility testing.

16. The method of claim 13, further comprising:
    removing a consumable from a top end of the stack of consumables for use in the analyzer.

17. The method of claim 16, wherein the packaging has a weakened portion at the top end of the stack of consumables, the top end of the stack of consumables being proximate to the proximal end of each receptacle that receives the stack of consumables.

\* \* \* \* \*